(12) United States Patent
Ikeda

(10) Patent No.: US 10,710,170 B2
(45) Date of Patent: Jul. 14, 2020

(54) CUTTING INSERT, CUTTING TOOL, AND METHOD OF MANUFACTURING MACHINED PRODUCT

(71) Applicant: Kyocera Corporation, Kyoto-shi, Kyoto (JP)

(72) Inventor: Yoshihito Ikeda, Ritto (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/322,121

(22) PCT Filed: Jul. 26, 2017

(86) PCT No.: PCT/JP2017/027078
§ 371 (c)(1),
(2) Date: Jan. 31, 2019

(87) PCT Pub. No.: WO2018/025723
PCT Pub. Date: Feb. 8, 2018

(65) Prior Publication Data
US 2019/0184468 A1  Jun. 20, 2019

(30) Foreign Application Priority Data

Aug. 3, 2016 (JP) .................................. 2016-152584

(51) Int. Cl.
*B23B 27/22* (2006.01)
*B23B 27/16* (2006.01)
*B23B 27/14* (2006.01)

(52) U.S. Cl.
CPC .......... *B23B 27/1611* (2013.01); *B23B 27/14* (2013.01); *B23B 27/22* (2013.01);
(Continued)

(58) Field of Classification Search
CPC ........ B23B 2200/081; B23B 2200/087; B23B 2200/321; B23B 2200/323;
(Continued)

(56) References Cited

U.S. PATENT DOCUMENTS 4,411,565 A * 10/1983 Hazra ................... B23B 27/143
407/114
4,626,141 A * 12/1986 Malaker ................ B23B 27/143
407/114
(Continued)

FOREIGN PATENT DOCUMENTS

EP          3124148 A4 * 11/2017 ........... B23B 27/143
JP       H10118809 A    5/1998
(Continued)

*Primary Examiner* — Sara Addisu
(74) *Attorney, Agent, or Firm* — Viering, Jentschura & Partner MBB

(57) ABSTRACT

A cutting insert includes an upper surface and upper edge. The upper surface includes a second side part, a first corner part, and a second corner part. The upper surface further includes a first surface and a second surface. The upper edge includes a first edge located at the first corner part, a second edge located at the second side part, and a third edge located at the second corner part. The second surface includes a first region extending toward the first corner part, and a second region extending toward the second corner part. A distance between the first region and the upper edge is smaller at a side of the second edge than at a side of the first edge. A distance between the second region and the upper edge is smaller at a side of the second edge than at a side of the third edge.

16 Claims, 13 Drawing Sheets

(52) U.S. Cl.
CPC . *B23B 2200/0452* (2013.01); *B23B 2200/081* (2013.01); *B23B 2200/20* (2013.01)

(58) Field of Classification Search
CPC ...... B23B 2200/325; B23B 2200/0452; B23B 2200/20; B23B 27/1611; B23B 27/22; B23B 27/14; Y10T 407/235; Y10T 407/23
See application file for complete search history.

(56) References Cited

U.S. PATENT DOCUMENTS

| | | | | |
|---|---|---|---|---|
| 6,065,907 | A * | 5/2000 | Ghosh | B23B 27/141 407/114 |
| 7,374,372 | B2 * | 5/2008 | Rofner | B23B 27/1618 407/113 |
| 2005/0019111 | A1* | 1/2005 | Kitagawa | B23B 27/141 407/113 |
| 2012/0051855 | A1* | 3/2012 | Lof | B23B 27/143 407/114 |
| 2013/0064613 | A1* | 3/2013 | Krishtul | B23B 27/143 407/114 |
| 2014/0248098 | A1* | 9/2014 | Pacheri | B23B 27/1607 407/114 |
| 2015/0043982 | A1* | 2/2015 | Tensaka | B23B 27/143 407/114 |
| 2015/0283617 | A1* | 10/2015 | Nagarajan | B23B 27/143 407/114 |
| 2015/0375303 | A1* | 12/2015 | Fujii | B23B 27/143 82/1.11 |
| 2016/0339525 | A1* | 11/2016 | Matsuda | B23B 27/143 |
| 2017/0120342 | A1* | 5/2017 | Fujii | B23B 27/143 |
| 2017/0297115 | A1* | 10/2017 | Ekden | B23B 27/141 |
| 2017/0297116 | A1* | 10/2017 | Sakai | B23B 27/145 |
| 2018/0318936 | A1* | 11/2018 | Ishi | B23B 51/00 |
| 2019/0009345 | A1* | 1/2019 | An | B23B 27/143 |
| 2019/0039152 | A1* | 2/2019 | Ikeda | B23C 5/06 |
| 2019/0061012 | A1* | 2/2019 | Ikeda | B23B 27/145 |
| 2019/0168310 | A1* | 6/2019 | Ikeda | B23B 27/143 |
| 2019/0184468 | A1* | 6/2019 | Ikeda | B23B 27/14 |

FOREIGN PATENT DOCUMENTS

| | | |
|---|---|---|
| JP | 2003220503 A | 8/2003 |
| WO | 2015147214 A1 | 10/2015 |

* cited by examiner

CUTTING INSERT, CUTTING TOOL, AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2017/027078 filed on Jul. 26, 2017, which claims priority to Japanese Application No. 2016-152584 filed on Aug. 3, 2016, which are entirely incorporated herein by reference.

TECHNICAL FIELD

The present disclosure relates to a cutting insert, a cutting tool and a method of manufacturing a machined product.

BACKGROUND

Indexable cutting tools with a cutting insert attached to a holder may be used as a cutting tool used in a cutting process or the like. The cutting insert used for the cutting tool may include a polygonal-shaped upper surface, a side surface, and a cutting edge located at an intersecting part of the upper surface and the side surface. The above cutting tool may be capable of cutting out a workpiece by bringing the cutting edge into contact with the workpiece.

Patent Document 1 (Japanese Unexamined Patent Publication No. 2003-220503) discloses a cutting insert used for the above cutting tool. The cutting insert discussed in Patent Document 1 may include a flat surface on a rhombus-shaped upper surface. The flat surface may be projected than a cutting edge and arranged highest in a thickness direction. The flat surface may extend toward a midpoint of a side ridge part of the rhombus shape. The cutting insert discussed in Patent Document 1 may further include breakers on the upper surface which are respectively formed at an acute angle corner and an obtuse angle corner. A top portion of each of the breakers may be a flat surface located at a height equal to the flat surface described above. The flat surface and the top portions of the breakers may function as a seating surface.

The flat surface serving as a seating surface may be arranged toward the midpoint of the side edge part serving as the cutting edge in the cutting insert discussed in Patent Document 1. Thus, the cutting insert discussed in Patent Document 1 may have seating stability. However, chip disposal may be unstable when used in a cutting process, such as a chamfering process.

SUMMARY

A cutting insert in a non-limiting aspect of the present disclosure may include an upper surface, a lower surface, a side surface and cutting edges. The upper surface may include a first side part, a second side part, a third side part, a first corner part located between the first side part and the second side part, and a second corner part located between the second side part and the third side part. The lower surface may be located on an opposite side of the upper surface. The side surface may be located between the upper surface and the lower surface. The cutting edges may be respectively located at an intersecting part of the upper surface and the side surface and an intersecting part of the lower surface and the side surface. The upper surface may further include a first surface located along the cutting edge and include a portion which is located lower than the cutting edge, and a flat second surface which is located above the cutting edge and is located farther from the cutting edge than the first surface. The cutting edges may include a first cutting edge located at the first corner part, a second cutting edge located at the second side part, and a third cutting edge located at the second corner part. The second surface may include a first region extending toward the first corner part, and a second region extending toward the second corner part. A length D7 of the first surface in a direction perpendicular to the cutting edge may have a maximum at a midportion of the second side part in a top view. A distance D1 between the first region and the cutting edge may be smaller at a side of the second cutting edge than at a side of the first cutting edge in a top view. A distance D2 between the second region and the cutting edge may be smaller at a side of the second cutting edge than at a side of the third cutting edge in a top view.

A cutting tool in a non-limiting aspect of the present disclosure may include a cutting insert as described above, and a holder designed to attach the cutting insert to the holder.

A method of manufacturing a machined product in a non-limiting aspect of the present disclosure may include rotating a workpiece, bringing a cutting tool as described above into contact with the workpiece being rotated, and moving the cutting tool away from the workpiece.

DETAILED DESCRIPTION

<Cutting Insert>

Figure 1:
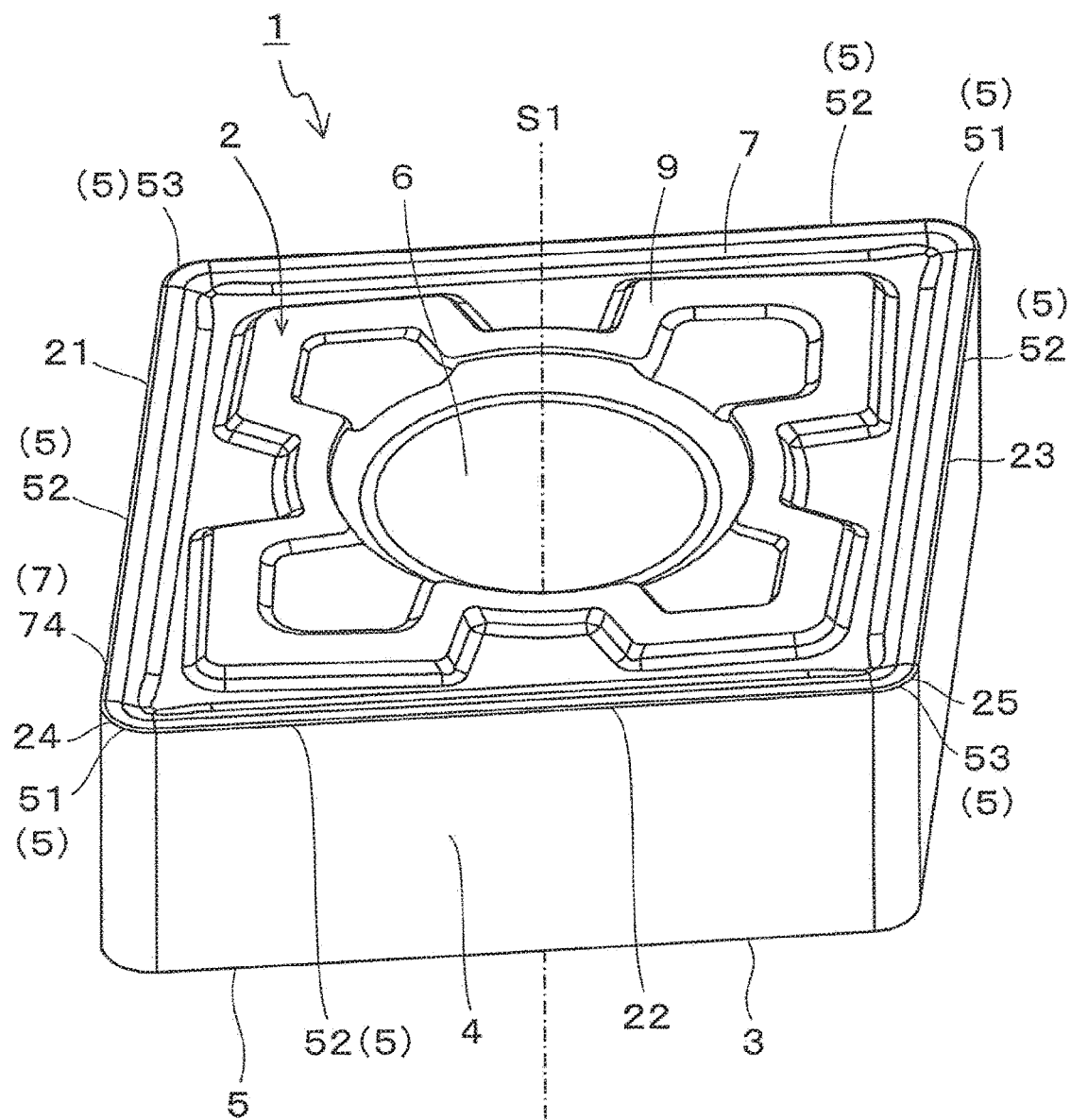
FIG. 1 is a perspective view illustrating a cutting insert in a non-limiting aspect of the present disclosure.

The cutting insert in a non-limiting aspect of the present disclosure is described in detail below with reference to the drawings. For the sake of description, the drawings referred to in the following illustrate, in a simplified form, only main members necessary for describing various non-limiting aspects of the disclosure. The cutting insert in a non-limiting aspect of the present disclosure is therefore capable of including any arbitrary structural member not illustrated in the drawings referred to. Dimensions of the members in each of the drawings do not faithfully represent dimensions of actual structural members and ratios of these members. These points are also true for a cutting tool and a method of manufacturing a machined product described later.

Figure 2:
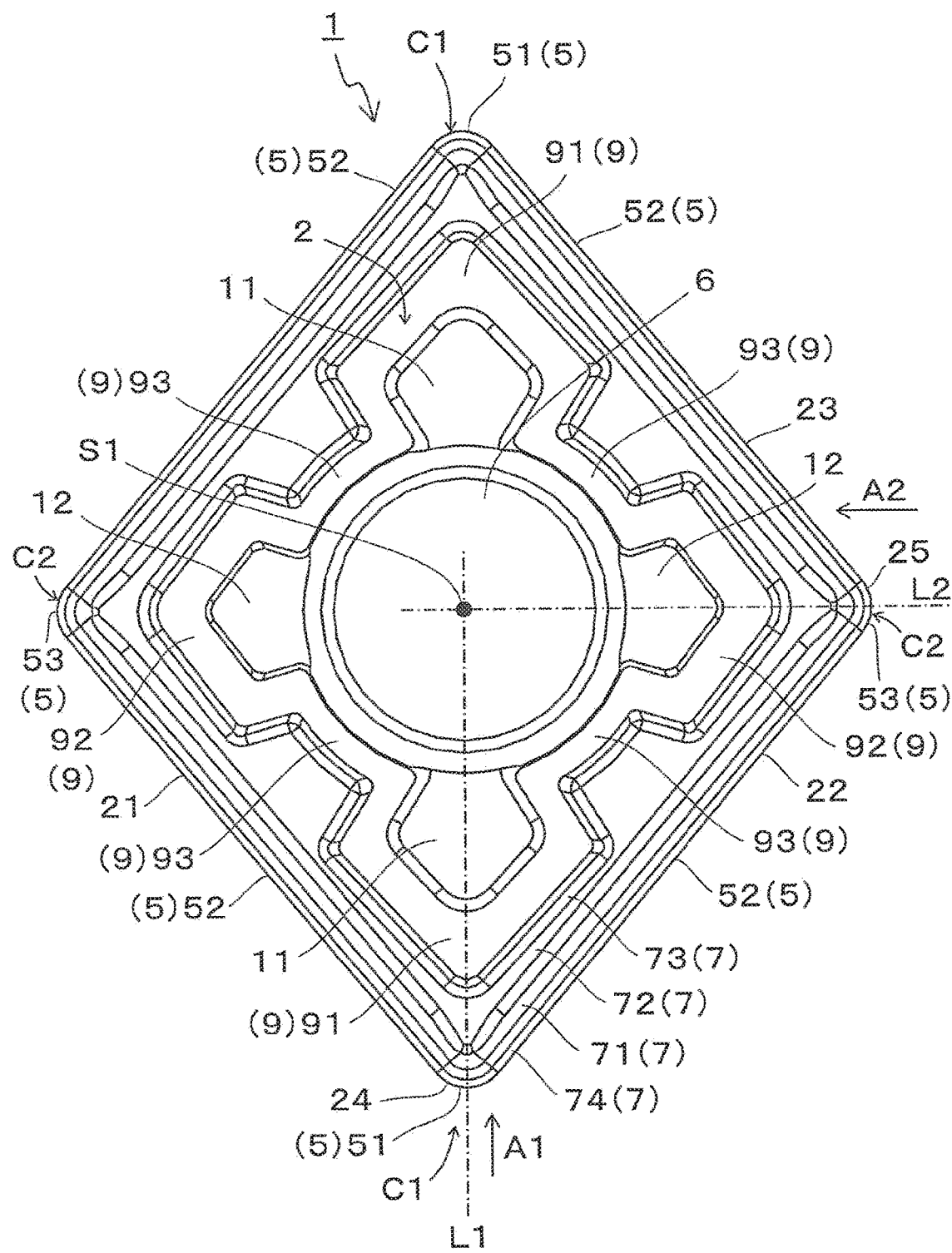
FIG. 2 is a top view of the cutting insert illustrated in FIG. 1.

The cutting insert 1 (hereinafter also referred to as "insert 1") in a non-limiting aspect of the present disclosure includes an upper surface 2, a lower surface 3, a side surface 4 and cutting edges 5 as illustrated in FIGS. 1 to 4. The lower surface 3 is located on an opposite side of the upper surface 2. The side surface 4 is located between the upper surface 2 and the lower surface 3. The cutting edges 5 are respectively located at an intersecting part of the upper surface 2 and the side surface 4, and at an intersecting part of the lower surface 3 and the side surface 4. The upper surface 2 includes a first surface 7 and a second surface 9. The insert 1 also includes a through hole 6 extending between the upper surface 2 and the lower surface 3 as illustrated in FIGS. 1 and 2. The upper surface 2 and the lower surface 3 are called for convenience sake and do not indicate up and down directions. For example, the upper surface 2 may not be a surface directed upward when the insert 1 is attached to a holder 103 described later.

As illustrated in FIG. 2, the insert 1 has an approximately quadrangular shape, more specifically an approximately rhombus shape when viewed from above (in a top view). That is, the upper surface 2 of the insert 1 has the approximately rhombus shape including two acute angle corners C1 and two obtuse angle corners C2, and has rotational symmetry of 180 degrees relative to a central axis S1 of the insert 1 in a top view. The upper surface 2 includes a first side part 21, a second side part 22, a third side part 23, a first corner part 24 and a second corner part 25. The first corner part 24 is located between the first side part 21 and the second side part 22. The second corner part 25 is located between the second side part 22 and the third side part 23. As illustrated in FIG. 2, the first corner part 24 is located at the acute angle corner C1, and the second corner part 25 is located at the obtuse angle corner C2.

The term "top view" denotes a state in which the insert 1 is viewed toward the upper surface 2 unless otherwise noted. The shape of the upper surface 2 of the insert 1 is not limited to the approximately quadrangular shape, but may be a polygonal shape including at least the first side part 21, the second side part 22, the third side part 23, the first corner part 24 and the second corner part 25. The insert 1 can be therefore made in a plate shape having an approximately polygonal shape, such as a triangular or pentagonal shape.

A side of the approximately rhombus shape of the insert 1 in a top view is settable to, for example, 6-25 mm. A distance between the upper surface 2 and the lower surface 3 in the insert 1, namely, a thickness of the insert 1 is settable to, for example, 1-10 mm. The term "thickness" denotes a line segment parallel to the central axis S1 of the insert 1 in a distance between a part of the upper surface 2 which is located uppermost and a part of the lower surface 3 which is located lowermost. The term "side view" denotes a state in which the insert 1 is viewed toward the side surface 4 unless otherwise noted in the following. The term "up and down directions" denotes a direction along the central axis S1 of the insert 1. When a direction from the inside of the insert 1 toward the upper surface 2 is positive and a direction from the inside of the insert 1 toward the lower surface 3 is negative, a positive side in a direction along the central axis S1 is upside, and a negative side in a direction along the central axis S1 is downside. The term "the central axis S1 of the insert 1" denotes an axis which extends between the upper surface 2 and the lower surface 3, and which serves as a rotation axis when the insert 1 is rotated in a top view.

Figure 3:
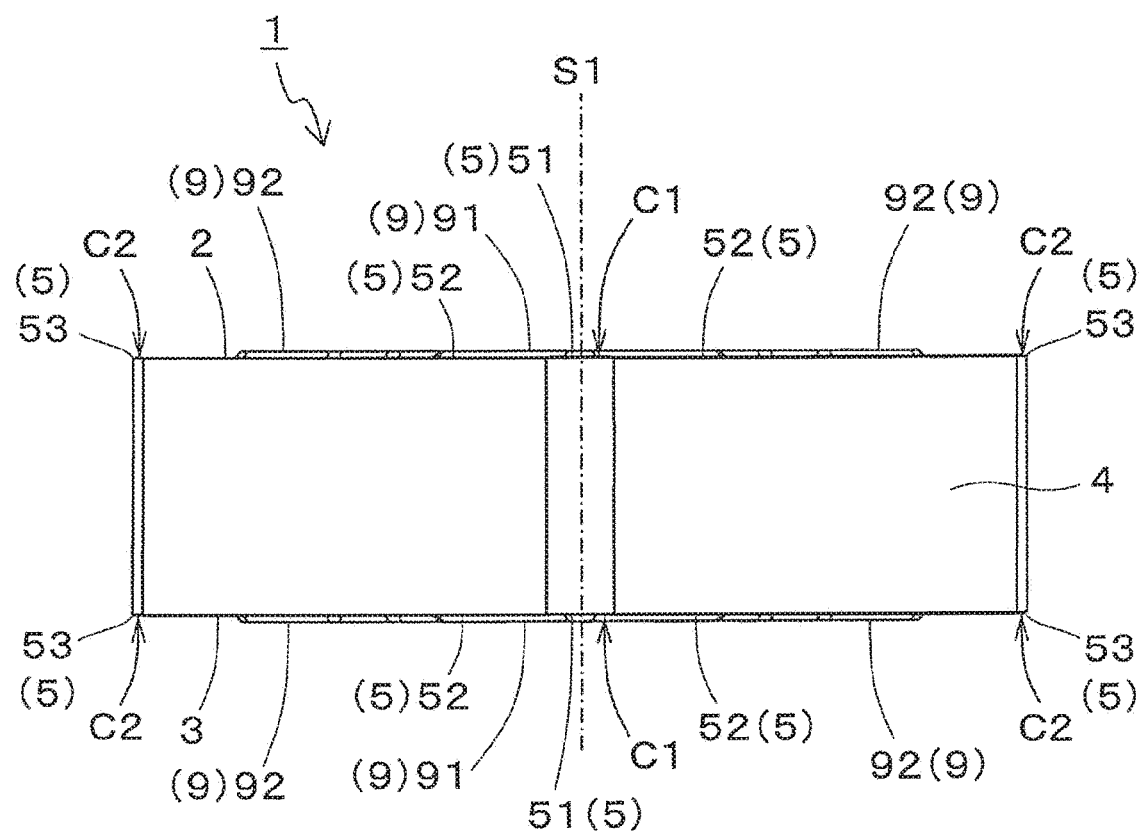
FIG. 3 is a side view of the cutting insert illustrated in FIG. 2, taken from the direction A1.
Figure 4:
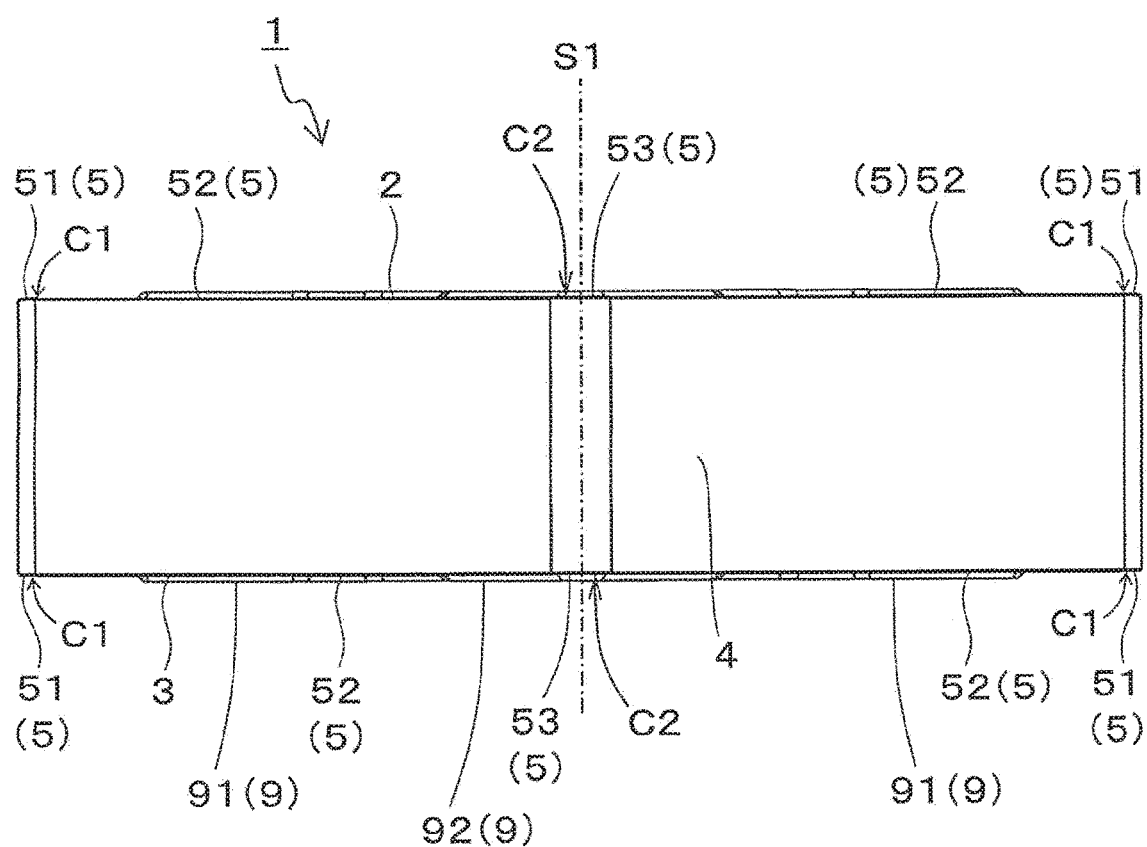
FIG. 4 is a side view of the cutting insert illustrated in FIG. 2, taken from the direction A2.

Like the side of the upper surface 2, the insert 1 also includes the cutting edge 5 at the intersecting part of the lower surface 3 and the side surface 4 as illustrated in FIGS. 1, 3 and 4. When a cutting process is carried out using the cutting edge 5 at a side of the lower surface 3, the upper surface 2 is usable as a seating surface with respect to the holder 103 described later. With the insert 1 of a non-limiting aspect of the present disclosure, each of the side of the upper surface 2 and the side of the lower surface 3 is usable in a cutting process. Therefore, the configuration at the side of the lower surface 3 has a shape obtained by inverting the configuration of the side of the upper surface 2 in order that the insert 1 is usable in a state in which the insert 1 is turned upside down. In other words, the insert 1 has rotational symmetry around a line perpendicular to a paper plane of FIG. 3. Hence, with the insert 1 in a non-limiting aspect of the present disclosure, the cutting process can be carried out using a total of eight corners, four corners on the upper surface 2 and four corners on the lower surface 3.

Although the configuration of the upper surface 2 of the insert 1 is the same as the configuration of the lower surface 3 in a non-limiting aspect of the present disclosure, the configuration of the side of the lower surface 3 may be different from the configuration on the side of the upper surface 2. For example, even though the configuration of the cutting edge 5 on the side of the upper surface 2 is the same as the configuration of the cutting edge 5 on the side of the lower surface 3 in the insert 1 of a non-limiting aspect of the present disclosure, the configuration of the cutting edge 5 on the side of the lower surface 3 is not limited thereto, and may be different from the configuration of the cutting edge 5 on the side of the upper surface 2.

Individual components of the insert 1 in a non-limiting aspect of the present disclosure are sequentially described in detail below.

(Side Surface 4)

The side surface 4 is located between the upper surface 2 and the lower surface 3, and connects to each of the upper surface 2 and the lower surface 3 as illustrated in FIGS. 1, 3 and 4. At least a part of the side surface 4 functions as a restraining surface when the insert 1 is attached to the holder 103, and also functions as a so-called flank surface for avoiding contact with a workpiece during a cutting process. The side surface 4 is disposed perpendicular to the upper surface 2 and the lower surface 3 in a non-limiting aspect of the present disclosure. Thus, the upper surface 2 has approximately the same shape as the lower surface 3 so as to be overlapped with each other in a top view.

(Cutting Edge 5)

The cutting edge 5 is located at the intersecting part of the upper surface 2 and the side surface 4, and includes a first cutting edge 51, a second cutting edge 52 and a third cutting edge 53. The cutting edge 5 is used for cutting out the workpiece during the cutting process. A so-called honing process may be applied to at least a part of a region where the upper surface 2 intersects with the side surface 4, and where the cutting edge 5 is located. Because of the honing process applied thereto, strength of the cutting edge 5 is less likely to become low. Examples of the honing process include round honing.

The first cutting edge 51 is the cutting edge located at the first corner part 23 of the upper surface 2, and is a so-called corner cutting edge. That is, the first cutting edge 51 functions to reduce fracture of the cutting edge 5. The first cutting edge 51 is located at the acute angle corner C1, and is a corner cutting edge used when cutting out using the acute angle corner C1 in a non-limiting aspect of the present disclosure. As illustrated in FIG. 2, the first cutting edge 51 has a curvilinear shape in a top view in a non-limiting aspect of the present disclosure. The first cutting edge 51 has a straight line shape in a side view as illustrated in FIG. 3, and a height of the first cutting edge 51 relative to the lower surface 3 is constant. When satisfying this configuration, cutting edge strength can be ensured. Tool life can also be enhanced even during a cutting process of a workpiece, such as cast iron. Alternatively, the first cutting edge 51 may be inclined relative to the lower surface 3 in a side view. For example, the first cutting edge 51 may be inclined toward the lower surface 3 as going farther from a bisector L1 of the first corner part 24 illustrated in FIG. 2.

The second cutting edge 52 is the cutting edge located at the second side part 22 of the upper surface 2, and is a so-called major cutting edge. That is, the second cutting edge 52 mainly functions to generate chips through cutting action. As illustrated in FIG. 2, the second cutting edge 52 has a straight line shape in a top view in a non-limiting aspect of the present disclosure. As illustrated in FIGS. 3 and 4, the second cutting edge 52 has a straight line shape and a height of the second cutting edge 52 relative to the lower surface 3 is constant in a side view. When satisfying this configuration, the cutting edge strength can be ensured. The tool life can also be enhanced even during the cutting process of a workpiece, such as cast iron. Like the first cutting edge 51, the second cutting edge 52 may be inclined relative to the lower surface 3 in a side view. For example, the second cutting edge 52 may be inclined toward the lower surface 3 as going farther from the first corner part 24 in a side view.

The third cutting edge 53 is the cutting edge located at the second corner part 25 of the upper surface 2, and is a so-called corner cutting edge as in the case of the first cutting edge 51. The third cutting edge 53 is located at the obtuse angle corner C2 and is a corner cutting edge used when cutting out using the obtuse angle corner C2 in a non-limiting aspect of the present disclosure. Like the first cutting edge 51, the third cutting edge 53 has a curvilinear shape in a top view in a non-limiting aspect of the present disclosure as illustrated in FIG. 2. The third cutting edge 53 has a straight line shape and a height of the third cutting edge 53 relative to the lower surface 3 is constant in a side view. When satisfying this configuration, the cutting edge strength can be ensured. The tool life can also be enhanced even during the cutting process of a workpiece, such as cast iron. Like the first cutting edge 51, the third cutting edge 53 may also be inclined toward the lower surface 3. For example, the third cutting edge 53 may be inclined toward the lower surface 3 as going farther from a bisector L2 of the second corner part 25 illustrated in FIG. 2.

The phrase that "the height of each of the cutting edges is constant" denotes that the height of each of the cutting edges relative to the lower surface 3 may not be strictly constant over an entire length of each of the cutting edges. Specifically, the phrase that "the height of each of the cutting edges is constant" denotes that the height of each of the cutting edges is substantially constant. For example, their height may have a difference of ±1 mm. The height of each of these cutting edges relative to the lower surface 3 is, for example, 3-8 mm.

As illustrated in FIGS. 3 and 4, the first cutting edge 51, the second cutting edge 52, and the third cutting edge 53 are located on a straight line in a side view in a non-limiting aspect of the present disclosure. That is, the first cutting edge 51, the second cutting edge 52 and the third cutting edge 53 have the same height relative to the lower surface 3. When satisfying this configuration, a cutting process becomes stable over the entire length of the cutting edge 5 because the cutting edge heights of the first cutting edge 51, the second cutting edge 52 and the third cutting edge 53 remain unchanged.

As described earlier, the cutting process can be carried out using the total of eight corners in the insert 1, the four corners on the upper surface 2 and the four corners on the lower surface 3. In this configuration, the cutting edge 5 includes two first cutting edges 51, four second cutting edges 52, and two third cutting edges 53 on each side of the upper surface 2 and the lower surface 3. With this configuration, a cutting process, a so-called chamfering process using only a side part located between two adjacent corner parts can be carried out besides the cutting process using the corners (corner parts).

The cutting edge 5 includes the two first cutting edges 51, the four second cutting edges 52, and the two third cutting edges 53 on each side of the upper surface 2 and the lower surface 3 in a non-limiting aspect of the present disclosure. The configuration of the cutting edge 5 in the insert 1 is, however, not limited to the configuration in a non-limiting aspect of the present disclosure. For example, the cutting edge 5 may include at least one first cutting edge 51, at least one second cutting edge 52, and at least one third cutting edge 53 on the side of the upper surface 2.

(Through Hole 6)

The through hole 6 is a hole for inserting a fastening screw or an attachment bolt when the insert 1 is attached to the holder 103. The insert 1 is fixed to the holder 103 of the cutting tool 1 through a clamp member 107 as described later with reference to FIG. 12 in a non-limiting aspect of the present disclosure. Therefore, a tip of the clamp member 107 for clamp fixing is inserted into the through hole 6. Subsequently, a screw 105 for fixing the clamp member 107 is screwed into the holder 103. Thereby, the tip of the clamp member 107 presses the insert 1 against the holder 103, so that the insert 1 is fixed to the holder 103. As a method of fixing the insert 1 to the holder 103, other methods, such as screw fixation, may be employed instead of the above method using a clamp structure. Alternatively, the insert 1 may not include the through hole 6 depending on a method for fixing the insert 1 to the holder 103.

As illustrated in FIG. 2, the through hole 6 is located at a midportion of the upper surface 2 in a non-limiting aspect of the present disclosure. More specifically, the through hole 6 passes through the insert 1 from a center of the upper surface 2 to a center of the lower surface 3. A central axis of the through hole 6 coincides with an imaginary straight line connecting the center of the upper surface 2 and the center of the lower surface 3. A central axis of the through hole 6 may be replaced with the central axis S1 of the insert 1.

(Upper Surface 2)

The upper surface 2 includes the first surface 7 and the second surface 9 as described above. The first surface 7 and the second surface 9 are arranged side by side in order from a side of the cutting edge 5.

Figure 6:
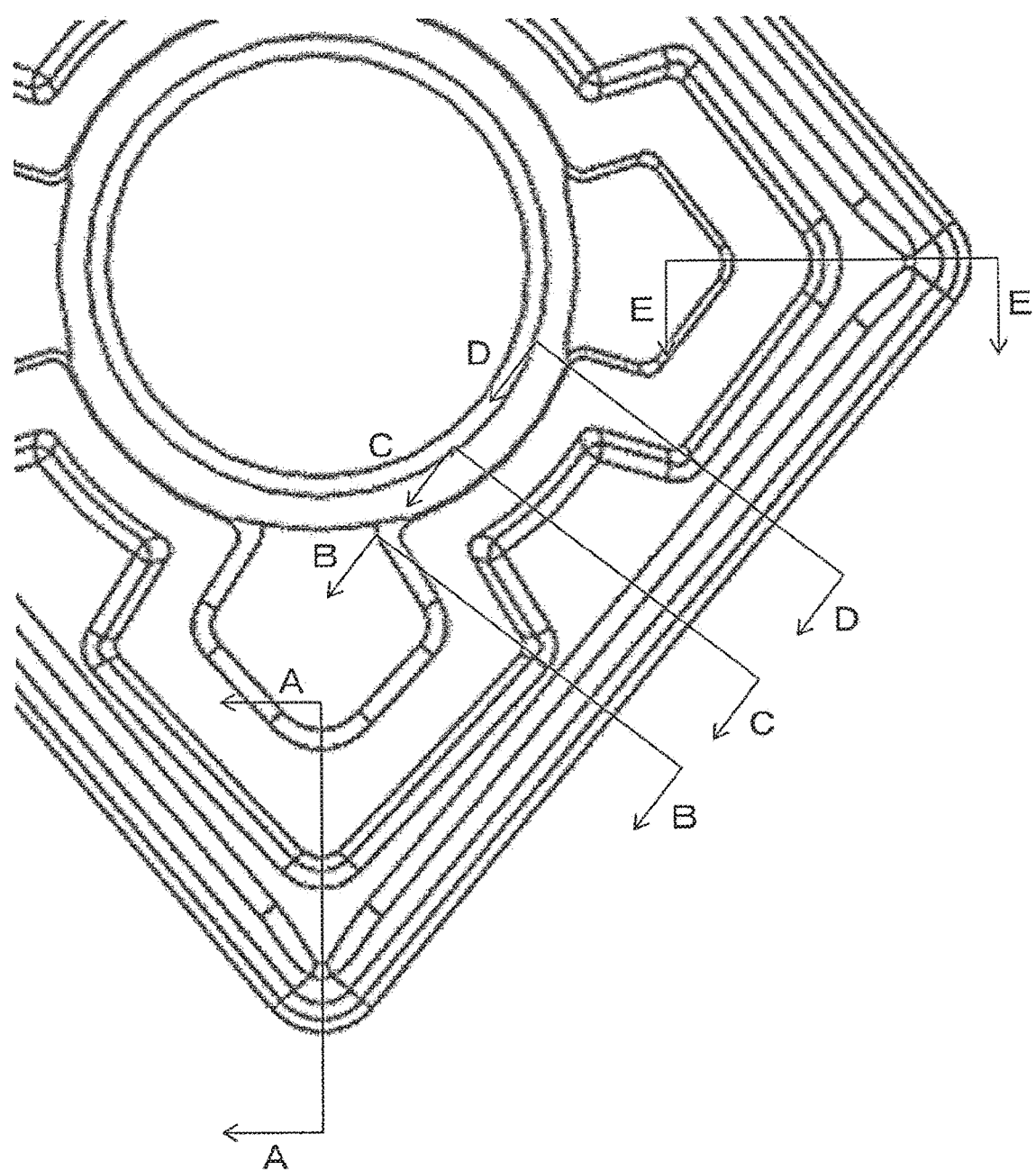
FIG. 6 is a diagram illustrating sectional positions in FIGS. 7 to 11 in the partially enlarged view of FIG. 2.

The first surface 7 is first described. The first surface 7 is a surface located along the cutting edge 5 and including a portion which is located lower than the cutting edge 5. The first surface 7 is also a part of the upper surface 2 which extends from the cutting edge 5 to the second surface 9. As illustrated in FIG. 2, the first surface 7 is a portion of the upper surface 2 which is located along the cutting edge 5 and located lower than the cutting edge 5 in a non-limiting aspect of the present disclosure. More specifically, the first surface 7 is a surface of the upper surface 2 which is located more inward than the cutting edge 5, and which functions as a so-called land surface or rake surface, as illustrated in FIGS. 7 to 11 that are respectively sectional views at individual sectional positions illustrated in FIG. 6. That is, the first surface 7 fulfils a role in smoothly discharging chips generated by the cutting edge 5 during a cutting process to the outside.

Alternatively, an entire region of the first surface 7 may not be located lower than the cutting edge 5. Still alternatively, the first surface 7 may include a flat surface-shaped portion or a curved surface-shaped portion. The term "flat surface-shape" is a concept that includes not only a strictly defined flat surface but also ones which include slight irregularities or curve in so far as they fulfil their function. This is also true for the term "curved surface shape." The term "inward" used above denotes a direction approaching the central axis S1. The term "outward" that is opposite to the term "inward" denotes a direction separating from the central axis S1.

As illustrated in FIGS. 7 to 11, the first surface 7 includes a first portion 71, a second portion 72 and a third portion 73 in order from a side of the cutting edge 5 in a non-limiting aspect of the present disclosure. The first portion 71 is a portion which is inclined toward the lower surface 3 as going farther from the cutting edge 5, and which functions as a so-called rake surface. The second portion 72 is a flat surface perpendicular to the central axis S1 of the insert 1, which is located lowermost in the first surface 7 and is the surface contributing to chip discharge performance. More specifically, the second portion 72 is useful in a smooth chip discharge by receiving, through a surface thereof, chips that are generated and then flow inward of the insert 1. The second portion 72 may be substantially perpendicular to the central axis S1 of the insert 1. The third portion 73 is a portion inclined so as to be located farther from the lower surface 3 as going farther from the cutting edge 5.

Figure 5:
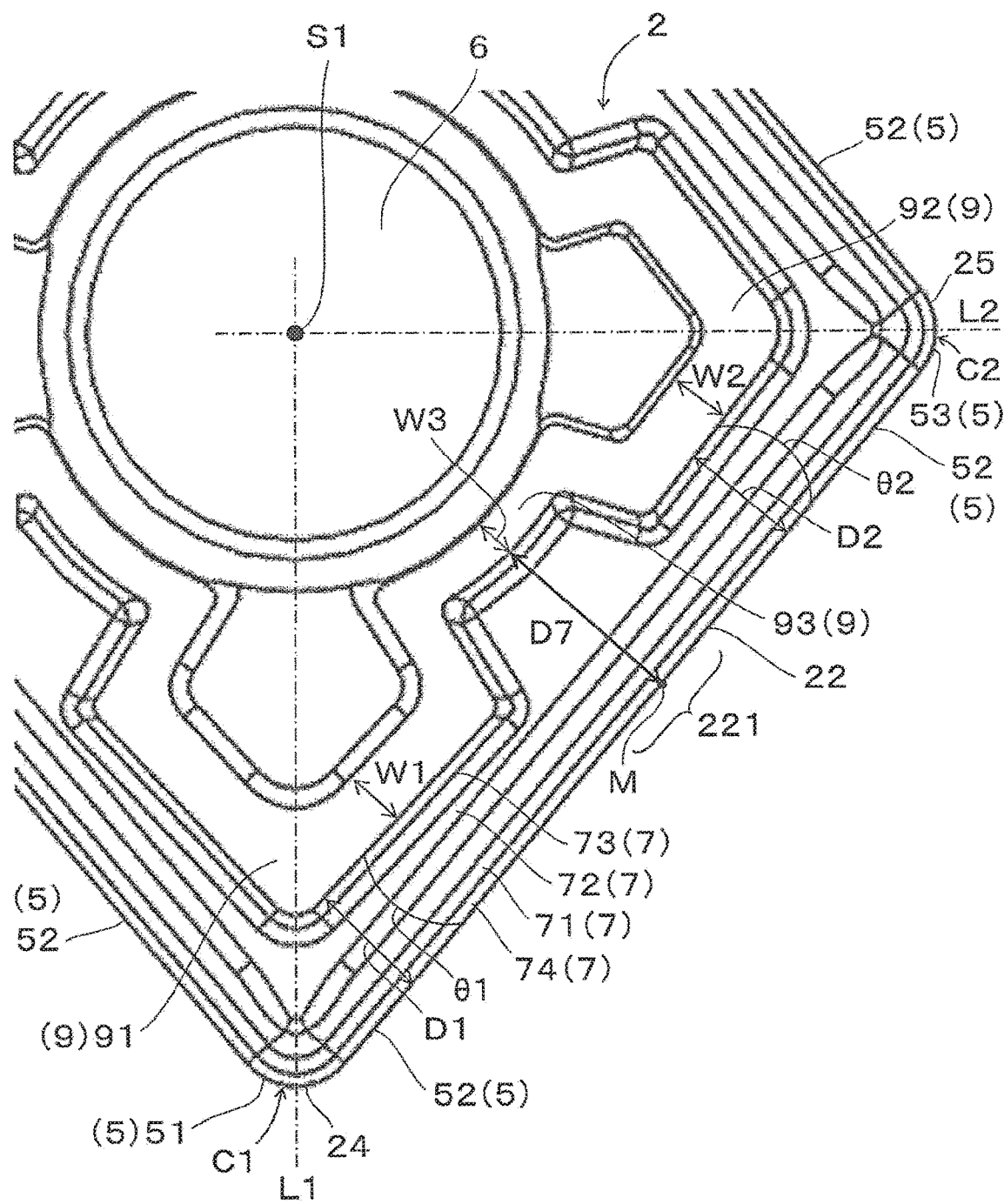
FIG. 5 is a partially enlarged view of FIG. 2.
Figure 9:
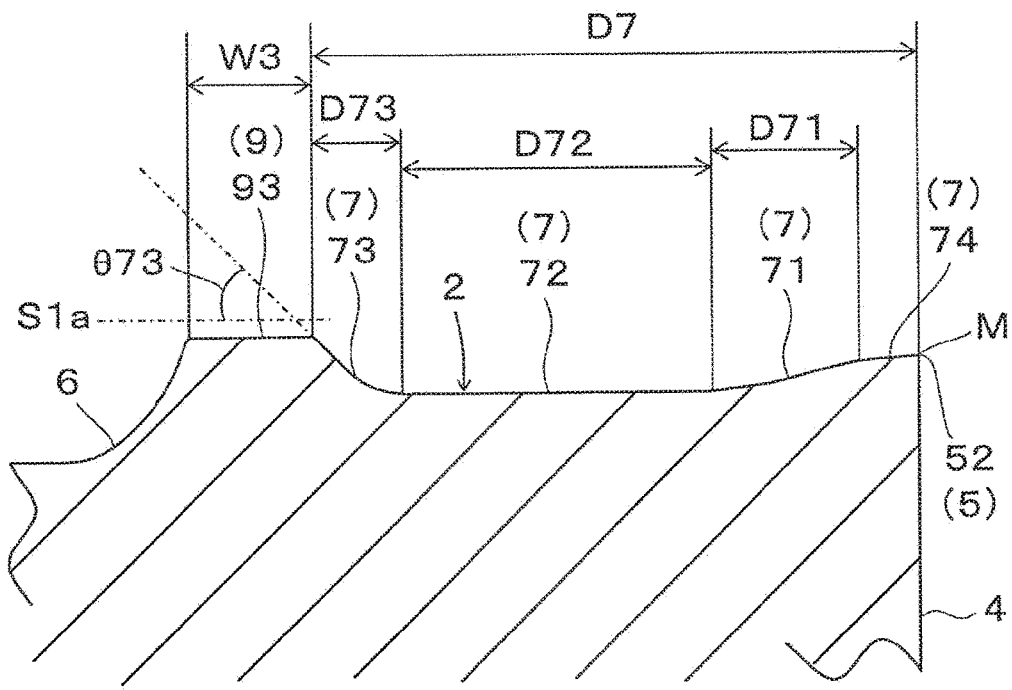
FIG. 9 is a sectional view taken along line C-C in FIG. 6.

As illustrated in FIGS. 5 and 9, a length D7 of the first surface 7 in a direction perpendicular to the cutting edge 5 has a maximum at a midportion 221 of the second side part 22 in a non-limiting aspect of the present disclosure. The midportion 221 of the second side part 22 is a portion of the second side part 22 which corresponds to a cutting edge region used during the chamfering process using the second cutting edge 52 located at the second side part 22. Therefore, the midportion 221 of the second side part 22 is the portion of the second side part 22 which has an arbitrary width including a midpoint M of the second side part 22. For example, the midportion 221 of the second side part 22 occupies 40-70% of an entire length of the second side part 22.

The length D7 of the first surface 7 has a maximum at the midportion 221 of the second side part 22 in a non-limiting aspect of the present disclosure. With this configuration, generated chips can be smoothly discharged outside after passing through the upper surface 2 even during the chamfering process using the second cutting edge 52 located at the second side part 22. A maximum value of the length D7 of the first surface 7 may be located at any portion of the midportion 221 of the second side part 22. In other words, the length D7 of the first surface 7 may not reach the maximum value over an entire region of the midportion 221 of the second side part 22. However, when the length D7 of the first surface 7 has an approximately maximum value over the entire region of the midportion 221 of the second side part 22 as in the case with a non-limiting aspect of the present disclosure, good chip discharge performance is achievable during the chamfering process using the second cutting edge 52 located at the second side part 22.

The term "length D7 of the first surface 7 in the direction perpendicular to the cutting edge 5" denotes a dimension of the first surface 7 in the direction perpendicular to the cutting edge 5 in a top view as illustrated in FIG. 5. More specifically, the length D7 is a dimension from the cutting edge 5 to the second surface 9 in the direction perpendicular to the central axis S1 of the insert 1 in a cross section perpendicular to the cutting edge 5 as illustrated in FIG. 9. The length D7 is, for example, 2-3 mm.

The second surface 9 is then described. The second surface 9 is a flat surface located above the cutting edge 5 and farther from the cutting edge 5 than the first surface 7. Specifically, the second surface 9 is a part of the upper surface 2 which is located more inward than the first surface 7 and located away from the cutting edge 5. The second surface 9 is a flat surface which is located above the cutting edge 5 and functions as a so-called seating surface when using the cutting edge 5 at the side of the lower surface 3. That is, the second surface 9 is a surface brought into contact with the holder 103 upon attachment of the insert 1 to the holder 103 when using the cutting edge 5 at the side of the lower surface 3. The term "flat" is a concept that includes not only a strictly defined flat but also ones which include slight irregularities or curve in so far as they fulfil their function.

Figure 7:
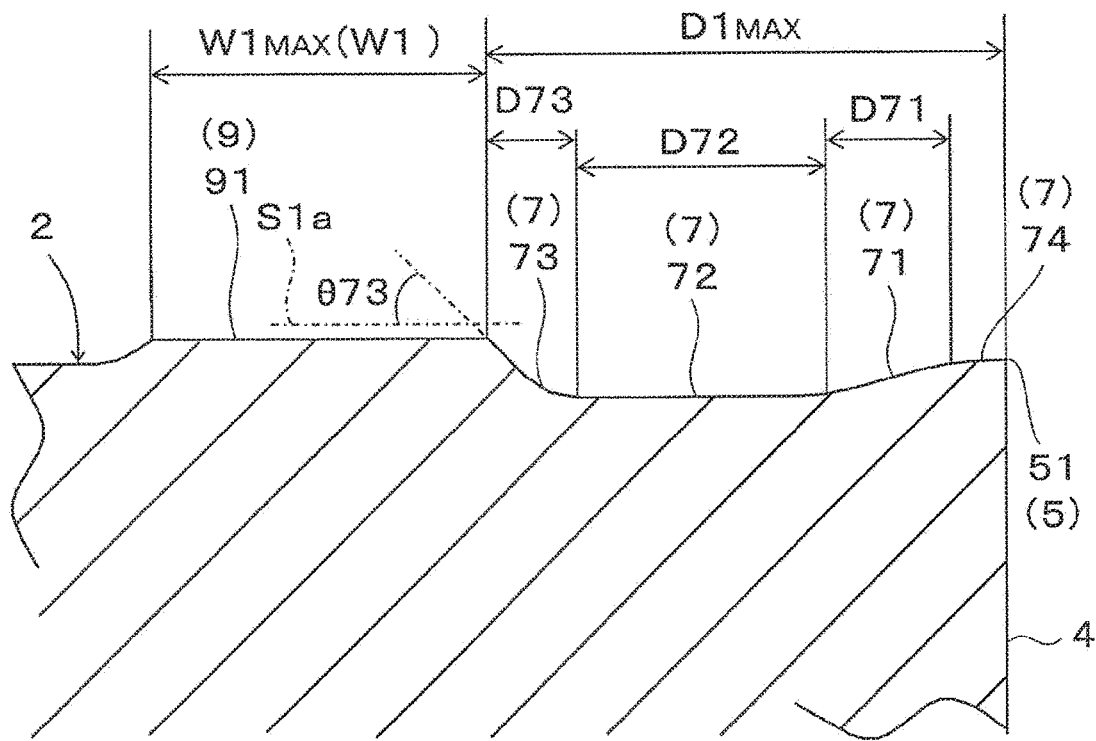
FIG. 7 is a sectional view taken along line A-A in FIG. 6.
Figure 8:
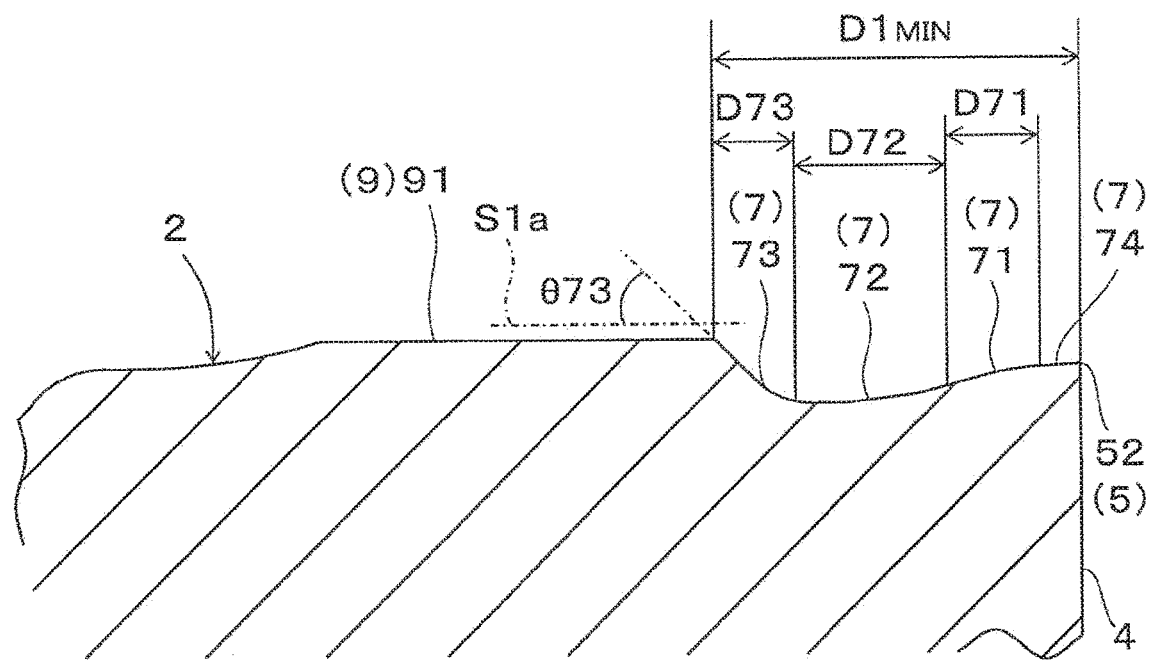
FIG. 8 is a sectional view taken along line B-B in FIG. 6.
Figure 10:
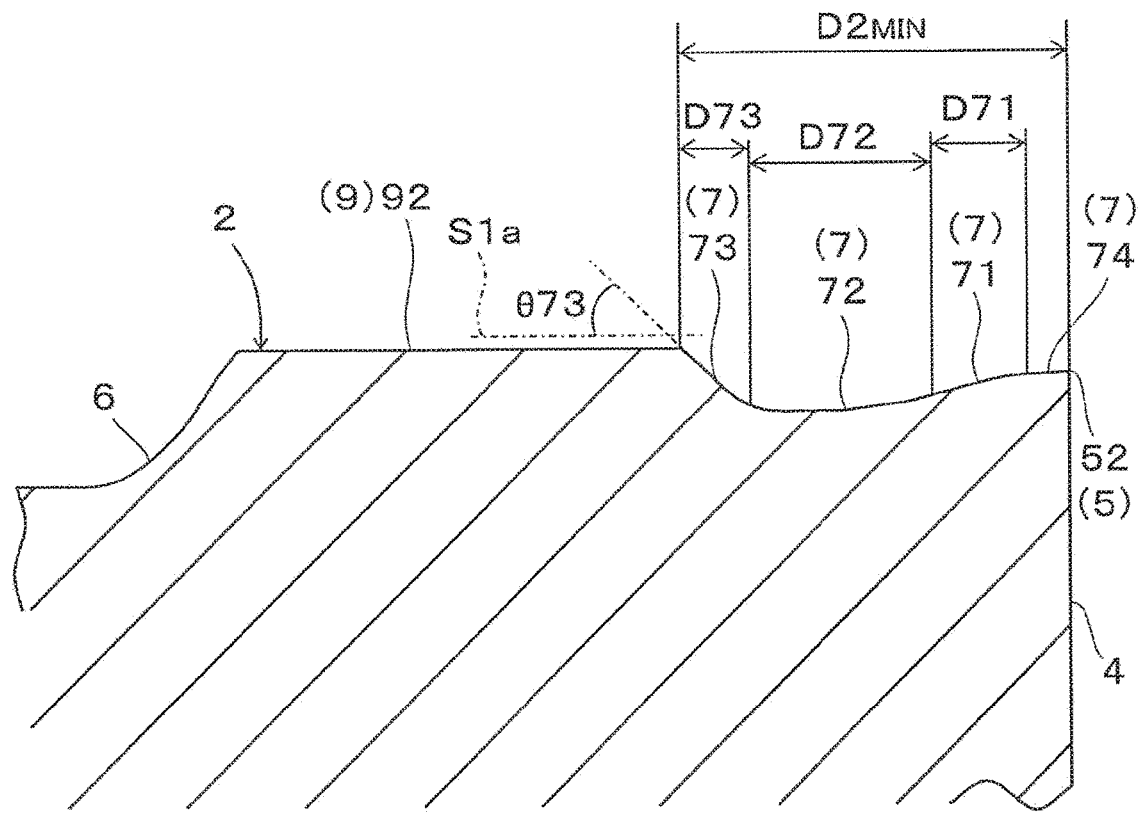
FIG. 10 is a sectional view taken along line D-D in FIG. 6.
Figure 11:
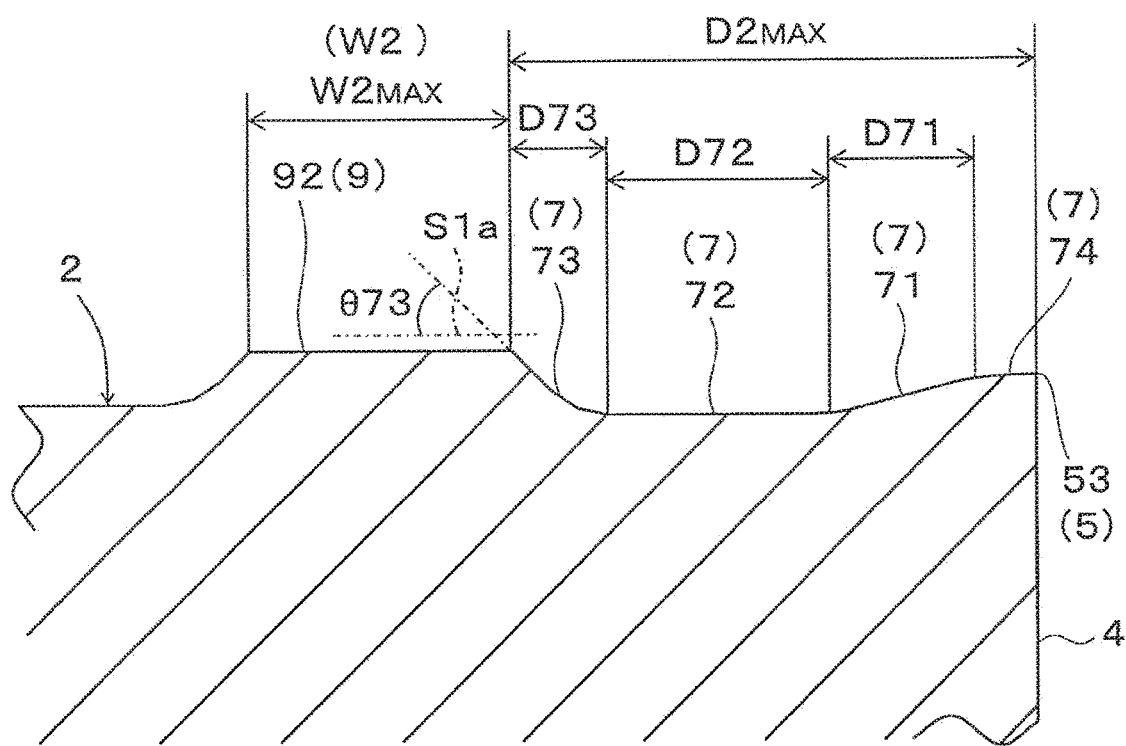
FIG. 11 is a sectional view taken along line E-E in FIG. 6.

The second surface 9 includes a first region 91 illustrated in FIGS. 7 and 8, and a second region 92 illustrated in FIGS. 10 and 11. As illustrated in FIG. 5, the first region 91 is a region of the second surface 9 which extends toward the first corner part 24, namely, an acute angle corner C1. More specifically, the first region 91 includes a portion along the first cutting edge 51 located at the first corner part 24, and a portion along the second cutting edge 52 located at the second side part 22. The second region 92 is a region of the second surface 9 which extends toward the second corner part 25, namely, the obtuse angle corner C2. More specifically, the second region 92 includes a portion along the third cutting edge 53 located at the second corner part 25, and a portion along the second cutting edge 52 located at the second side part 22.

A distance D1 between the first region 91 and the cutting edge 5 (the first cutting edge 51 or the second cutting edge 52) at a side of the second cutting edge 52 is smaller than that at a side of the first cutting edge 51, and a distance D2 between the second region 92 and the cutting edge 5 (the third cutting edge 53 or the second cutting edge 52) at a side of the second cutting edge 52 is smaller than that at a side of the third cutting edge 53 in a non-limiting aspect of the present disclosure. In other words, the distance D1 includes a first distance and a second distance which is located closer to the second cutting edge 52 than the first distance and is smaller than the first distance. The distance D2 includes a third distance and a fourth distance which is located closer to the second cutting edge 52 than the third distance and is smaller than the third distance.

Thus, a non-limiting aspect of the present disclosure includes the first surface 7 whose length D7 has the maximum at the midportion 221 of the second side part 22, and the second surface 9 including the distance D1 and the distance D2. This leads to good seating stability during a cutting process using the first corner part 24 and during a cutting process using the second corner part 25 because a large seating surface is left in the vicinity of the corresponding corner part. Additionally, during a cutting process (chamfering process) using the second side part 22, good chip disposal performance is obtainable because a space for discharging chips is left for a smooth disposal of generated chips in the vicinity of the midportion 221 of the second side part 22. The insert 1 is consequently capable of fulfilling good cutting performance in a variety of cutting processes.

Alternatively, the distance D1 between the first region 91 and the cutting edge 5 may decrease as going from the first cutting edge 51 toward the second cutting edge 52 in a non-limiting aspect of the present disclosure as illustrated in FIG. 5. In other words, the distance D1 may decrease as going farther from the first cutting edge 51. That is, the distance D1 may have a maximum value on a bisector of the first cutting edge 51, namely, the bisector L1 of the first corner part 24, and may decrease as going farther from the first cutting edge 51. More specifically, the distance D1 may have a maximum value D1MAX on the bisector of the first cutting edge 51 (the bisector L1 of the first corner part 24) as illustrated in FIG. 7, and may have a minimum value D1MIN at a furthest position from the first cutting edge 51 in the first region 91 as illustrated in FIG. 8.

The distance D2 between the second region 92 and the cutting edge 5 may decrease as going from the third cutting edge 53 toward the second cutting edge 52 in a non-limiting aspect of the present disclosure as illustrated in FIG. 5. In other words, the distance D2 may decrease as going farther from the third cutting edge 53. That is, the distance D2 may have a maximum value on the bisector of the third cutting edge 53, namely, the bisector L2 of the second corner part 25, and may decrease as going farther from the third cutting edge 53. More specifically, the distance D2 may have a maximum value D2MAX on the bisector of the third cutting edge 53 (the bisector L2 of the second corner part 25) as illustrated in FIG. 11, and may have a minimum value D2MIN at a furthest position from the third cutting edge 53 in the second region 92 as illustrated in FIG. 10.

Various aspects of the present disclosure are designed to satisfy the above configurations, namely, the configuration that the distance D1 decreases as going from the first cutting edge 51 toward the second cutting edge 52, and the configuration that the distance D2 decreases as going from the third cutting edge 53 toward the second cutting edge 52. When satisfying these configurations, the effect of fulfilling good cutting performance can be enhanced in a variety of cutting processes.

The phrase that "the distance D1 decreases" denotes that besides cases where the distance D1 decreases over the entire length from the first cutting edge 51 to the second cutting edge 52, a portion in which the distance D1 remains unchanged may be included in a range from the first cutting edge 51 to the second cutting edge 52. In other words, a portion in which the distance D1 is constant may be included, or a portion in which the distance D1 does not decrease at a constant rate, may be included in the range from the first cutting edge 51 to the second cutting edge 52. Alternatively, the distance D1 may decrease stepwise. The configuration that the distance D2 decreases can be defined in the same manner as the distance D1. When the distances D1 and D2 decrease gradually at a fixed rate, chip discharge performance can be improved while ensuring strength of the second surface 9. This further enhances the effect of fulfilling the good cutting performance in a variety of cutting processes.

The term "distance D1" denotes a dimension between the first region 91 and the first cutting edge 51 or the second cutting edge 52 in the direction perpendicular to the cutting edge 5 in a top view as illustrated in FIG. 5. More specifically, the distance D1 is a dimension from the cutting edge 5 to the first region 91 in the direction perpendicular to the central axis S1 of the insert 1 in a cross section perpendicular to the cutting edge 5 as illustrated in FIGS. 7 and 8. The distance D2 can be defined in the same manner as the distance D1.

As described earlier, the length D7 of the first surface 7 is the dimension from the cutting edge 5 to the second surface 9 in the direction perpendicular to the central axis S1 of the insert 1 in the cross section perpendicular to the cutting edge 5. Therefore, the distance D1 and the distance D2 can also be referred to the length D7 of the first surface 7. That is, the D1MAX in FIG. 7, the D1MIN in FIG. 8, the D2MIN in FIG. 10, and the D2MAX in FIG. 11 can be rephrased to the length D7 of the first surface 7 in the individual cross sections. The distance D1 is, for example, 1-1.5 mm. The distance D2 is, for example, 1.2-1.8 mm.

As illustrated in FIGS. 2, 5 and 9, the second surface 9 may further include a third region 93 along the midportion 221 of the second side part 22 in a non-limiting aspect of the present disclosure. In this case, the first region 91 may connect to the second region 92 with the third region 93 interposed therebetween. When satisfying these configurations, the seating stability can be enhanced. In particular, the seating stability during the cutting process (chamfering process) using the second side part 22 can be enhanced to improve the cutting performance in a variety of cutting processes. These configurations also contribute to improving fitting into a clamp member 107 used for attaching the insert 1 to the holder 103.

Alternatively, each of the first region 91, the second region 92 and the third region 93 may have a band shape in a non-limiting aspect of the present disclosure as illustrated in FIG. 2. When satisfying this configuration, it is possible to reduce a material for the insert while maintaining the seating stability.

As illustrated in FIGS. 2, 5 and 9, the second surface 9 may connect to the through hole 6 with at least the third region 93 interposed therebetween in a non-limiting aspect of the present disclosure. In other words, the third region 93 may be located adjacent to the through hole 6. When satisfying this configuration, it is possible to ensure a large space that allows chips to pass therethrough during the cutting process, such as the chamfering process, and it is also possible to maintain high fitting force into the clamp member 107.

As illustrated in FIGS. 5, 7, 9 and 11, each of a width W1 of the first region 91 in the direction perpendicular to the cutting edge 5, and a width W2 of the second region 92 in a direction perpendicular to the cutting edge 5 may be greater than a width W3 of the third region 93 in a direction perpendicular to the cutting edge 5. When satisfying this configuration, it is possible to ensure a large seating surface at a corner subjected to a large load during a cutting process using the corner, and also ensure a large chip discharge space during the chamfering process. This leads to further improved seating stability and chip discharge performance. This also contributes to reducing a contact pressure applied to the holder 103 or a sheet member 106 described later. The holder 103 or the sheet member 106 is therefore less likely to be damaged.

The terms "width W1, width W2 and width W3" respectively denote widths of the regions 91, 92 and 93 each having the band shape in a top view as illustrated in FIG. 5. More specifically, dimensions perpendicular to an outer edge in a width direction of the band-shaped regions 91, 92 and 93 are respectively the width W1, the width W2 and the width W3 in a non-limiting aspect of the present disclosure as illustrated in FIG. 5. The width W1 is, for example, 0.6-1 mm. The width W2 is, for example, 0.6-1 mm. The width W3 is, for example, 0.3-0.8 mm.

Alternatively, the width W1 of the first region 91 in the direction perpendicular to the cutting edge 5 may have a maximum on the bisector L1 of the first corner part 24 as illustrated in FIG. 7. That is, the width W1 may have a maximum value W1MAX on the bisector L1 of the first corner part 24. When satisfying this configuration, a large seating surface is ensured in the vicinity of the acute angle corner C1 subjected to a large cutting load during a cutting process using the acute angle corner C1 (the first corner part 24). A stress is therefore less likely to be concentrated on the seating surface in the vicinity of the acute angle corner C1. The seating surface is consequently less likely to be fractured.

Alternatively, the width W2 of the second region 92 in the direction perpendicular to the cutting edge 5 may have a maximum on the bisector L2 of the second corner part 25 as illustrated in FIG. 11. That is, the width W2 may have a maximum value W2MAX on the bisector L2 of the second corner part 25. When satisfying this configuration, a large seating surface is ensured in the vicinity of the obtuse angle corner C2 subjected to a large cutting load during a cutting process using the obtuse angle corner C2 (the second corner part 25). A stress is therefore less likely to be concentrated on the seating surface in the vicinity of the obtuse angle corner C2. The seating surface is consequently less likely to be fractured.

Still alternatively, the maximum value W1MAX of the width W1 of the first region 91 may be greater than the maximum value W2MAX of the width W2 of the second region 92. When satisfying this configuration, the insert 1 is much less likely to be inclined toward the acute angle corner C1 during the cutting process using either one of the acute angle corner C1 (the first corner part 24) and the obtuse angle corner C2 (the second corner part 25). This consequently leads to improved finished surface accuracy.

As illustrated in FIG. 5, an angle $\theta 1$ formed by an outer edge of the first region 91 and the second cutting edge 52 may be greater than an angle $\theta 2$ formed by an outer edge of the second region 92 and the second cutting edge 52 in a top view. When satisfying this configuration, the insert 1 is much less likely to be inclined toward the acute angle corner C1 during the above cutting process.

The term "outer edge of the first region 91" denotes a part of an edge part of the first region 91 which is located outward, namely, an edge part located at a side of the second cutting edge 52. Similarly, the term "outer edge of the second region 92" denotes a part of an edge part of the second region 92 which is located outward, namely, an edge part located at a side of the second cutting edge 52. The angle $\theta 1$ is, for example, 2-5 degrees. The angle $\theta 2$ is, for example, 1-4 degrees.

A minimum value D1MIN of the distance D1 between the first region 91 and the cutting edge 5 (the second cutting edge 52) may be smaller than a minimum value D2MIN of the distance D2 between the second region 92 and the cutting edge 5 (the second cutting edge 52) in a top view. When satisfying this configuration, it is possible to further enhance the effect of reducing the probability that the insert 1 is inclined toward the acute angle corner C1 during the above cutting process.

As illustrated in FIGS. 7 to 11, the first surface 7 may further include a flat bottom surface 72 (a second portion) that is parallel to the second surface 9. The bottom surface 72 may be located lowermost in the first surface 7. When satisfying these configurations, by receiving, through a surface, chips flowing inward of the insert 1 as described above, the chips can be discharged smoothly. The phrase that "the bottom surface 72 is parallel to the second surface 9" denotes that the bottom surface 72 is substantially parallel to the second surface 9, and the bottom surface 72 may include an error of ±1 degree relative to the second surface 9. Alternatively, the bottom surface 72 may include a curved surface-shaped portion.

As illustrated in FIGS. 7 to 11, the first surface 7 may further include an inclined surface 73 (third portion) inclined toward the lower surface 3 as going outward from the second surface 9. In this case, an inclination angle $\theta 73$ of the inclined surface 73 may be constant along the cutting edge 5. In other words, the inclination angle $\theta 73$ of the inclined surface 73 may be constant over an entire length of the first surface 7. When satisfying these configurations, it is possible to uniformly disperse a stress that occurs in the second surface 9 functioning as a seating surface. The seating surface is consequently less likely to be fractured.

Here, the inclination angle $\theta 73$ is an inclination angle of the inclined surface 73 relative to a reference plane S1$a$ perpendicular to the central axis S1 extending between the upper surface 2 and the lower surface 3. That is, the inclination angle $\theta 73$ is an angle formed by the inclined surface 73 and the reference plane S1$a$ perpendicular to the central axis S1 extending between the upper surface 2 and the lower surface 3 as illustrated in FIGS. 7 to 11. The inclination angle $\theta 73$ is, for example, 40-50 degrees.

The phrase that "the inclination angle $\theta 73$ is constant" has no intention of limiting to cases where the inclination angle $\theta 73$ is strictly constant. That is, the phrase that "the inclination angle $\theta 73$ is constant" denotes that the inclination angle $\theta 73$ is substantially constant, and may have a difference of, for example, ±1 degree.

The second portion 72 may connect to the first portion 71 and also connect to the third portion 73 in a non-limiting aspect of the present disclosure. When satisfying this configuration, generated chips can be smoothly discharged by suitably being received on the first surface 7. A different portion may be located between the first portion 71 and the second portion 72, and between the second portion 72 and the third portion 73 in so far as the portions 71, 72 and 73 fulfil their function.

As illustrated in FIGS. 7 to 11, a length D71 of the first portion 71 in the direction perpendicular to the cutting edge 5, a direction D72 of the second portion 72 in the direction perpendicular to the cutting edge 5, and a length D73 of the third portion 73 in the direction perpendicular to the cutting edge 5 may have a relationship of D72>D71>D73 in a non-limiting aspect of the present disclosure. When satisfying this configuration, a smooth chip discharge and improved cutting edge strength are attainable.

The lengths D71, D72 and D73 in the direction perpendicular to the cutting edge 5 can be defined in the same manner as the length D7 described above. That is, the lengths D71, D72 and D73 in the direction perpendicular to the cutting edge 5 are dimensions of the corresponding portions 71, 72 and 73 in the direction perpendicular to the cutting edge 5 in a top view. More specifically, the lengths D71, D72 and D73 are dimensions of the corresponding portions 71, 72 and 73 in the direction perpendicular to the central axis S1 of the insert 1 in the cross section perpendicular to the cutting edge 5 as illustrated in FIGS. 7 to 11. The length D71 is, for example, 0.3-1 mm. The length D72 is, for example, 0.5-2.5 mm. The length D73 is, for example, 0.2-0.7 mm.

As illustrated in FIGS. 2 and 5, the first surface 7 may further include a fourth portion 74 located along the cutting edge 5, in addition to the first portion 71, the second portion 72 and the third portion 73 described above in a non-limiting aspect of the present disclosure. The fourth portion 74 functions as a so-called land surface. The fourth portion (land surface) 74 is a positive land surface that is inclined toward the lower surface 3 as going farther from the cutting edge 5 over the entire length of the cutting edge 5 as illustrated in FIGS. 7 to 11. That is, the fourth portion (land surface) 74 along the cutting edge 5 of any one of the first cutting edge 51, the second cutting edge 52 and the third cutting edge 53 is also a positive land surface. When satisfying this configuration, it is possible to suitably reduce cutting resistance in a variety of cutting processes.

As illustrated in FIG. 2, the upper surface 2 may further include a first recess 11 surrounded by the first region 91, and a second recess 12 surrounded by the second region 92 in a non-limiting aspect of the present disclosure. When satisfying this configuration, the material for the insert can be reduced, and chip clogging is less likely to occur, thus leading to improved seating stability. The phrase that "the first recess 11 is surrounded by the first region 91" denotes that an entire periphery of the first recess 11 may not be strictly surrounded by the first region 91 as in a non-limiting aspect of the present disclosure illustrated in FIG. 2. That is, a part of an outer periphery of the first recess 11 may connect to the through hole 6. This is also true for the configuration that the second recess 12 is surrounded by the second region 92.

Lastly, for example, cemented carbide or cermet is usable as a material of the insert 1 in a non-limiting aspect of the present disclosure having the configurations described above. Examples of compositions of the cemented carbide include WC—Co, WC—TiC—Co and WC—TiC—TaC—Co. The WC-Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

A surface of the insert 1 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN) and alumina ($Al_2O_3$).

<Cutting Tool>

The cutting tool in a non-limiting aspect of the present disclosure is described below with reference to the drawings.

Figure 12:
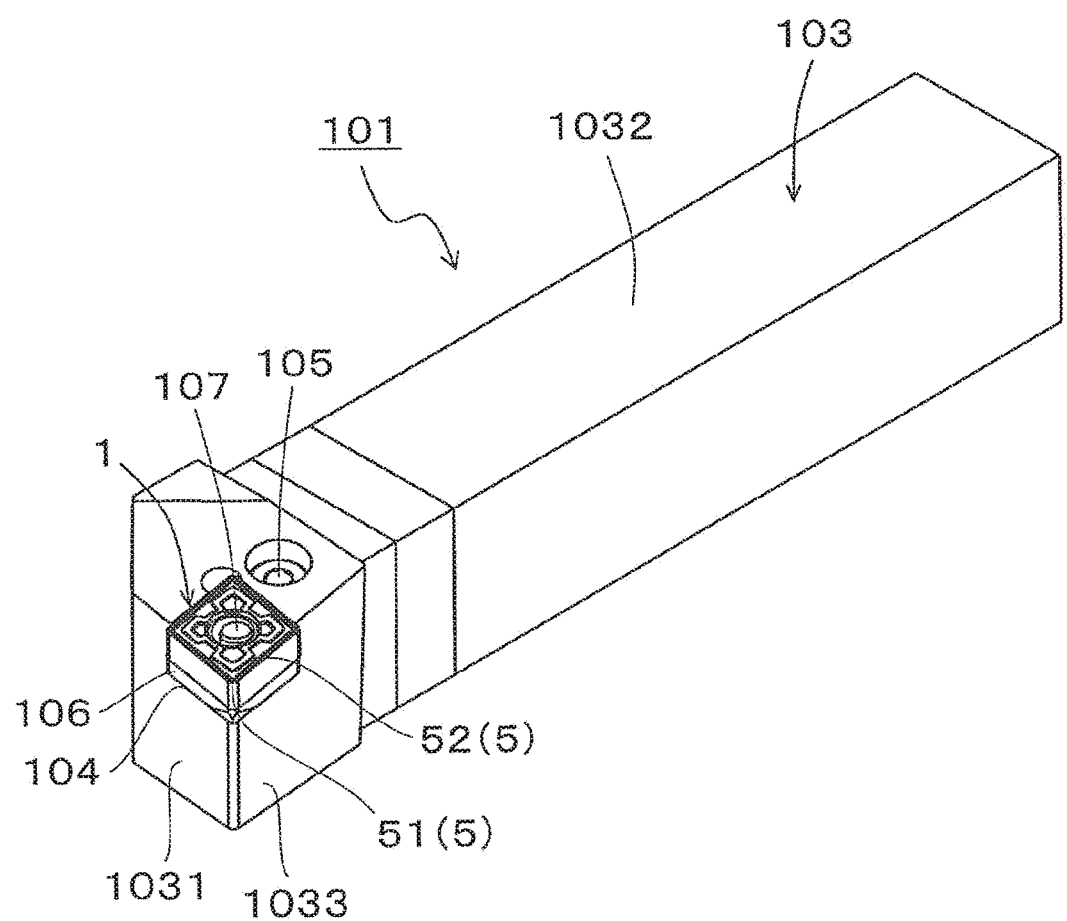
FIG. 12 is a perspective view illustrating a cutting tool in a non-limiting aspect of the present disclosure.

As illustrated in FIG. 12, the cutting tool 101 in a non-limiting aspect of the present disclosure includes the insert 1 described above, and the holder 103 designed to attach the insert 1 thereto.

The holder 103 in a non-limiting aspect of the present disclosure has a long narrow bar shape. An end portion (tip portion) of the holder 103 includes an insert pocket 104 to which the insert 1 is attached. The insert pocket 104 is a portion designed to receive the insert 1, and opens into a front end surface 1031 and two side surfaces 1032 and 1033 in the holder 103. For example, steel or cast iron is usable as material of the holder 103. Of these materials, steel with high rigidity may be used.

The following is a method of attaching the insert 1 to the holder 103. More specifically, a method of attaching the insert 1 to the holder 103 when cutting out using the acute angle corner C1 or carrying out the chamfering process is described below.

The insert 1 is attached to the insert pocket 104 so that the cutting edge 5 projects outward from an outer periphery of the holder 103. More specifically, the insert 1 is attached to the holder 103 so that the second cutting edge 52 is usable as a major cutting edge as illustrated in FIG. 12. That is, the second cutting edge 52 is located at a side of the side surface 1033 of the holder 103, and the first cutting edge 51 is located at a corner part formed by the front end surface 1031 and the side surface 1033. When cutting out using the obtuse angle corner C2, the insert 1 is attached to a holder having a different shape from the holder 103. More specifically, the insert 1 is attached to the holder having the different shape from the holder 103 so that the second cutting edge 52 is usable as a major cutting edge and the third cutting edge 53 is usable as a corner cutting edge.

The insert 1 is fixed to the insert pocket 104 by the clamp member 107 in a non-limiting aspect of the present disclosure. Specifically, a screw 105 is inserted into a through hole of the clamp member 107 in a state in which a tip of the clamp member 107 is inserted into the through hole 6 of the insert 1. Screw parts are engaged with each other by inserting a tip of the screw 105 into a screw hole (not illustrated) formed in the holder 103, so that the tip of the clamp member 107 presses the insert 1 against the holder 103. Thus, the insert 1 is attachable to the holder 103.

A sheet member 106 may be disposed between the insert pocket 104 and the insert 1 in a non-limiting aspect of the present disclosure. The insert 1 is therefore less likely to be fractured or the like. Various shapes are usable for the sheet member 106.

The cutting tool 101 in a non-limiting aspect of the present disclosure includes the insert 1 having the above characteristic configurations, and hence suitable seating stability and chip discharge performance are achievable in a variety of cutting processes. It is consequently possible to improve cutting performance and tool life.

<Method of Manufacturing Machined Product>

A method of manufacturing a machined product in a non-limiting aspect of the present disclosure is described below with reference to the drawings.

Figure 13:
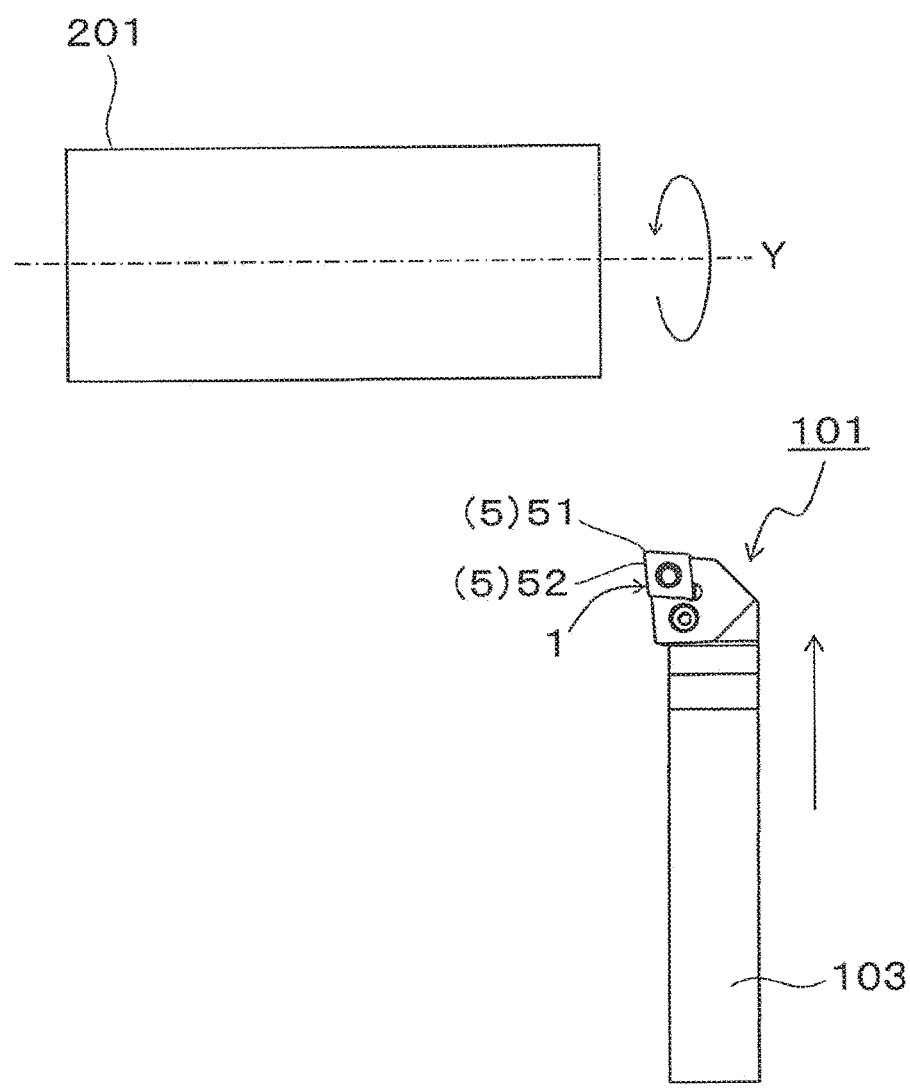
FIG. 13 is a schematic diagram illustrating a step in a method of manufacturing a machined product in a non-limiting aspect of the present disclosure.
Figure 14:
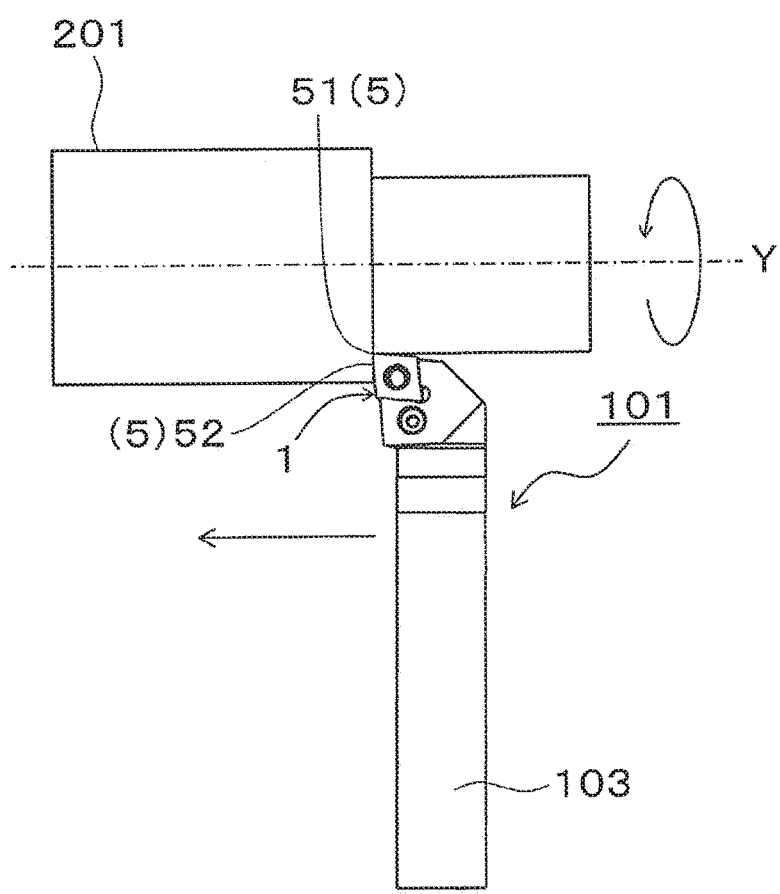
FIG. 14 is a schematic diagram illustrating a step in the method of manufacturing a machined product in a non-limiting aspect of the present disclosure.
Figure 15:
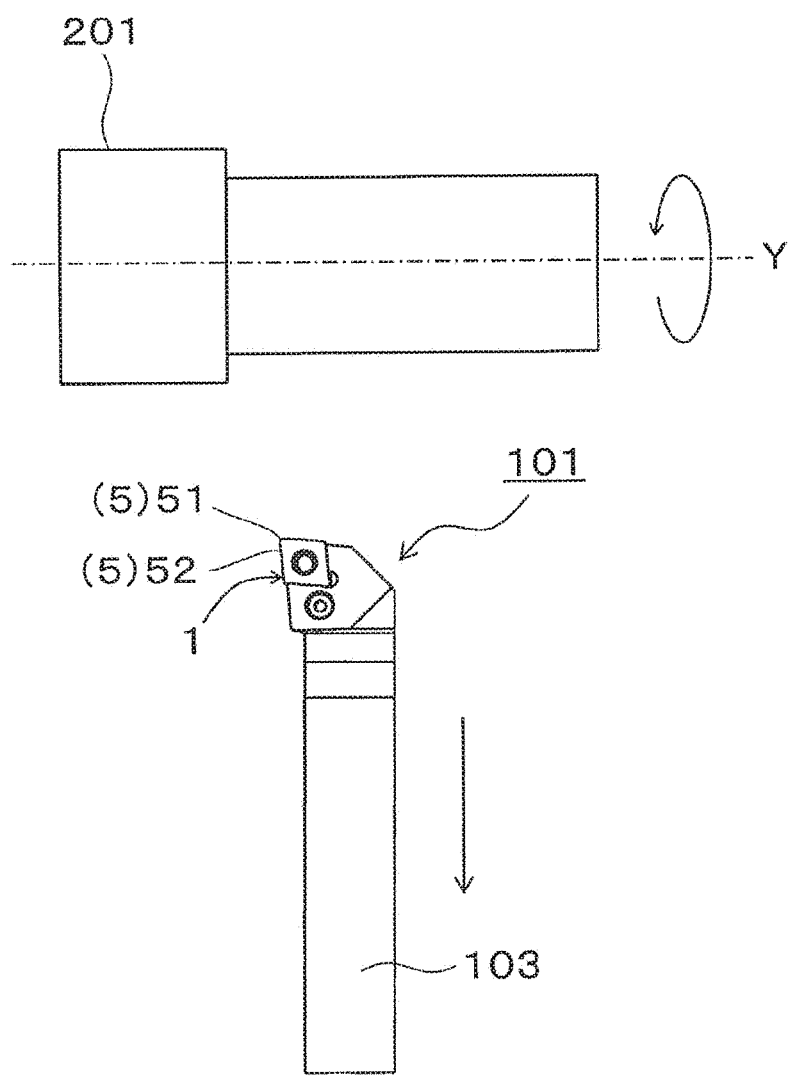
FIG. 15 is a schematic diagram illustrating a step in the method of manufacturing a machined product in a non-limiting aspect of the present disclosure.

The manufacturing method in a non-limiting aspect of the present disclosure includes the following steps:

(1) bringing the cutting tool 101 described above relatively near a workpiece 201 in a state in which the workpiece 201 is rotated as illustrated in FIG. 13;

(2) bringing the cutting edge 5 of the cutting tool 101 into contact with the workpiece 201 being rotated as illustrated in FIG. 14; and (3) moving the cutting tool 101 away from the workpiece 201 as illustrated in FIG. 15.

With the method of manufacturing a machined product in a non-limiting aspect of the present disclosure, the cutting tool 101 includes the insert 1 having the above characteristic configurations, and is therefore capable of providing good seating stability and chip discharge performance in a variety of cutting processes. This consequently enhances finished surface accuracy of a machined product and also improves manufacturing efficiency.

FIG. 13 illustrates a situation where the cutting tool 101 is brought near the workpiece 201 by fixing a rotation axis Y of the workpiece 201 and by rotating the workpiece 201. FIG. 14 illustrate a situation where a cutting process is carried out by bringing the cutting tool 101 into contact with the workpiece 201 in a state in which the workpiece 201 is rotated. FIG. 15 illustrates a situation where the workpiece 201 is rotated and the cutting tool 101 is moved away from the workpiece 201 in a state in which the rotation axis Y is fixed. Although the workpiece 201 is rotated and the cutting tool 101 is moved in the state in which the rotation axis Y is fixed in each of the steps in a non-limiting aspect of the present disclosure, there is, of course, no intention to limit thereto.

For example, the workpiece 201 may be brought near the cutting tool 101 in the step (1). Similarly, the workpiece 201 may be moved away from the cutting tool 101 in the step (3). When the cutting process is continued, the step of bringing the cutting edge 5 of the insert 1 into contact with different portions of the workpiece 201 may be repeated, while keeping the workpiece 201 rotated. When the cutting edge 5 being used is worn out, an unused cutting 5 may be used by rotating the insert 1 180 degrees around the central axis S1.

Examples of material of the workpiece 201 include carbon steel, alloy steel, stainless steel, cast iron and nonferrous metals.

While the various non-limiting aspects of the present disclosure have been illustrated and described above, the present disclosure is not limited to the foregoing non-limiting aspects of the present disclosure. It is, of course, possible to make any optional ones in so far as they do not depart from the gist of the present disclosure.

Singular forms "a", "an" and "the" in the entirety of the present disclosure include plural forms thereof unless clearly indicated not being so from the context.

DESCRIPTION OF THE REFERENCE NUMERALS 1 cutting insert (insert)
2 upper surface
  21 first side part
  22 second side part
  221 midportion
  23 third side part
  24 first corner part
  25 second corner part
3 lower surface
4 side surface
5 cutting edge
  51 first cutting edge
  52 second cutting edge
  53 third cutting edge
6 through hole
7 first surface
  71 first portion
  72 second portion (bottom surface)
  73 third portion (inclined surface)
  74 fourth portion (land surface)
9 second surface
  91 first region
  92 second region
  93 third region
11 first recess
12 second recess
101 cutting tool
103 holder
  1031 front end surface
  1032 side surface
  1033 side surface
104 insert pocket
105 screw
106 sheet member
107 clamp member
201 workpiece

The invention claimed is:

1. A cutting insert, comprising:
an upper surface comprising a first corner part, a second corner part, and a side part located between the first corner part and the second corner part;
a lower surface opposite to the upper surface;
a lateral surface located between the upper surface and the lower surface; and
an upper edge located at an intersection of the upper surface and the lateral surface; wherein
the upper surface further comprises:
a first surface located along the upper edge and comprising a portion which is located lower than the upper edge, and
a flat second surface which is located above the upper edge and is located farther from the upper edge than the first surface;
the upper edge comprises:
a first edge located at the first corner part,
a second edge located at the side part, and
a third edge located at the second corner part;
the second surface comprises:
a first region extending toward the first corner part, and
a second region extending toward the second corner part;
a length of the first surface in a direction perpendicular to the upper edge reaches a maximum at a midportion of the side part in a top view;
a first distance between the first region and the upper edge becomes smaller as going from the first edge toward the second edge in the top view; and
a second distance between the second region and the upper edge becomes smaller as going from the third edge toward the second edge in the top view.

2. The cutting insert according to claim 1, wherein a first width of the first region in a direction perpendicular to the upper edge has a first maximum value on a bisector of the first corner part.

3. The cutting insert according to claim 2, wherein a second width of the second region in a direction perpendicular to the upper edge has a second maximum value on a bisector of the second corner part.

4. The cutting insert according to claim 3, wherein the first maximum value is greater than the second maximum value.

5. The cutting insert according to claim 1, wherein the second surface further comprises a third region located between the first region and the second region and connects to the first region and the second region.

6. The cutting insert according to claim 5, wherein
further comprising a through hole extending between the upper surface and the lower surface, and
the third region connects to the through hole.

7. The cutting insert according to claim 1, wherein
the first surface further comprises a bottom surface located lowermost in the first surface, and
the bottom surface has a flat shape and is parallel to the second surface.

8. The cutting insert according to claim 1, wherein
the first surface further comprises an inclined surface being inclined toward the lower surface as going away from the second surface, and
an inclination angle of the inclined surface is constant along the upper edge.

9. The cutting insert according to claim 1, wherein
an angle formed by an outer edge of the first region and the second edge in the top view is a first angle,
an angle formed by an outer edge of the second region and the second edge in the top view is a second angle, and
the first angle is greater than the second angle.

10. The cutting insert according to claim 1, wherein
a minimum value of the first distance is less than a minimum value of the second distance in the top view.

11. The cutting insert according to claim 1, wherein the upper surface further comprises:
a first recess surrounded by the first region, and
a second recess surrounded by the second region.

12. A cutting tool, comprising:
the cutting insert according to claim 1; and
a holder designed to attach the cutting insert to the holder.

13. A method of manufacturing a machined product, comprising:
rotating a workpiece;
bringing the cutting tool according to claim 12 into contact with the workpiece being rotated; and
moving the cutting tool away from the workpiece.

14. A cutting insert, comprising:
an upper surface comprising:
a first corner part;
a second corner part; and
a side part located between the first corner part and the second corner part;
a lower surface opposite to the upper surface;
a lateral surface located between the upper surface and the lower surface; and
an upper edge located at an intersection of the upper surface and the lateral surface; wherein
the upper edge comprises:
a first edge located at the first corner part,
a second edge located at the side part, and
a third edge located at the second corner part;
the second surface comprises:
a first region extending toward the first corner part, and
a second region extending toward the second corner part;
the upper surface further comprises:
a first surface located along the upper edge and comprising a portion which is located lower than the upper edge,
a flat second surface which is located above the upper edge and is located farther from the upper edge than the first surface,
a first recess surrounded by the first region, and
a second recess surrounded by the second region;
a length of the first surface in a direction perpendicular to the upper edge reaches a maximum at a midportion of the side part in a top view,
a first distance between the first region and the upper edge becomes smaller as going from the first edge toward the second edge in the top view,
a second distance between the second region and the upper edge becomes smaller as going from the third edge toward the second edge in the top view, and
a minimum value of the first distance is less than a minimum value of the second distance in the top view.

15. The cutting insert according to claim 14, wherein an angle formed by an outer edge of the first region and the second region in the top view is a first angle.

16. The cutting insert according to claim 15, wherein
an angle formed by an outer edge of the second region and the second edge in the top view is a second angle, and
the first angle is greater than the second angle.

* * * * *